US012633296B1

(12) United States Patent
Silvfast et al.

(10) Patent No.: US 12,633,296 B1
(45) Date of Patent: May 19, 2026

(54) ACOUSTIC EVENT SENSOR

(71) Applicant: Apple Inc., Cupertino, CA (US)

(72) Inventors: Robert D. Silvfast, Belmont, CA (US);
Nicholas C. Soldner, Mountain View,
CA (US); Siddharth S. Hazra,
Hayward, CA (US)

(73) Assignee: Apple Inc., Cupertino, CA (US)

( * ) Notice: Subject to any disclaimer, the term of this
patent is extended or adjusted under 35
U.S.C. 154(b) by 1011 days.

(21) Appl. No.: 17/691,404

(22) Filed: Mar. 10, 2022

Related U.S. Application Data

(60) Provisional application No. 63/184,036, filed on May
4, 2021.

(51) Int. Cl.
| | |
|---|---|
| *G10L 19/02* | (2013.01) |
| *G06N 20/00* | (2019.01) |
| *G10L 19/008* | (2013.01) |
| *G10L 19/16* | (2013.01) |
| *G10L 19/20* | (2013.01) |
| *H04R 1/10* | (2026.01) |

(52) U.S. Cl.
CPC .......... *G10L 19/0204* (2013.01); *G06N 20/00*
(2019.01); *G10L 19/008* (2013.01); *G10L
19/167* (2013.01); *G10L 19/20* (2013.01);
*H04R 1/1041* (2013.01); *H04R 1/1091*
(2013.01)

(58) Field of Classification Search
CPC . G10L 19/0204; G10L 19/008; G10L 19/167;
G10L 19/20; G06N 20/00; H04R 1/1041;
H04R 1/1091
USPC .......................................................... 704/1
See application file for complete search history.

(56) References Cited

U.S. PATENT DOCUMENTS

| | | | | |
|---|---|---|---|---|
| 8,611,552 | B1 * | 12/2013 | Murgia ................ | H04R 1/1083 |
| | | | | 381/71.8 |
| 2018/0213339 | A1 * | 7/2018 | Shah .................... | H04R 25/558 |

OTHER PUBLICATIONS

Kwak, Jun-Hyuk, et al., "Fabrication of Si3N4-Based Artificial
Basilar Membrane with ZnO Nanopillar Using MEMS Process,"
Journal of Sensors, vol. 2017, Article ID 1308217, Jul. 9, 2017, 12
pages.
Zhang, Yansheng, et al., "Insect-inspired acoustic micro-sensors,"
ScienceDirect, Current Opinion in Insect Science, 2018, 30:33-38,
Sep. 6, 2018, 6 pages.
Oletic, Dinko, et al., "Low-power multichannel spectro-temporal
feature extraction circuit for audio pattern wake-up," 2016 Design,
Automation & Test in Europe Conference & Exhibition (DATE),
Mar. 14, 2016, 6 pages.
Rumberg, Brandon, et al., "A Low-Power and High-Precision
Programmable Analog Filter Bank," IEEE Transactions on Circuits
and Systems—II: Express Briefs, vol. 59, No. 4, Apr. 2012, pp.
234-238.

(Continued)

*Primary Examiner* — Thierry L Pham
(74) *Attorney, Agent, or Firm* — Aikin & Gallant, LLP

(57) ABSTRACT

An integrated circuit package having integrated therein an
array of acoustic to electrical transducers that produce
analog audio sub-band signals, an analog detector circuit to
produce for each sub-band a number of analog property
signals, an analog to digital conversion circuit to digitize
each of the analog property signals, and an encoder to
produce for each sub-band a feature set that contains one or
more features of a respective sub-band. Other aspects are
also described and claimed.

19 Claims, 5 Drawing Sheets

(56)         References Cited

OTHER PUBLICATIONS

Asadnia, Mohsen, et al., "Artificial ciliary bundles with nano fiber tip links," ARXIV.org, May 10, 2015, 17 pages.

Widder, John, et al., "Basic Principles of MEMS microphones," EDN, retrieved from the Internet <https://www.edn.com/basic-principles-of-mems-microphones/>, May 14, 2014, 16 pages.

Shah, Muhammad Ali, et al., "Design Approaches of MEMS Microphones for Enhanced Performance," Journal of Sensors, vol. 2019, Article ID 9294528, Mar. 6, 2019, 27 pages.

Shkel, Anton A., et al., "A Resonant Piezoelectric Microphone Array for Detection of Acoustic Signatures in Noisy Environments," MEMS 2015, Jan. 18, 2015, 4 pages.

Asadnia, Mohsen, et al., "From Biological Cilia to Artificial Flow Sensors: Biomimetic Soft Polymer Nanosensors with High Sensing Performance," Scientific Reports, 6:32955, Sep. 13, 2016, 13 pages.

Ciganovic, Nikola, et al., "Static length changes of cochlear outer hair cells can tune low-frequency hearing," PLOS Computational Biology, Jan. 19, 2018, 20 pages.

DiSilets, Charles S., "Transducer Arrays Suitable for Acoustic Imaging," Doctoral Thesis, Edward L. Ginzton Laboratory, Stanford University, G.L. Report No. 2833, Jun. 1978, 190 pages.

Zhang, Yansheng, et al., "Multi-Band Asymmetric Piezoelectric MEMS Microphone Inspired by the Ormia Ochracea," MEMS 2016, Jan. 24, 2016, 4 pages.

Zhang, Yansheng, et al., "Biomimetic MEMS Directional Microphone Structures for Multi-Band Operation," IEEE Sensors 2014, Nov. 2, 2014, 5 pages.

* cited by examiner

ACOUSTIC EVENT SENSOR

This patent application claims the benefit of the earlier filing date of U.S. provisional application No. 63/184,036 filed May 4, 2021.

FIELD

The disclosure here generally relates to electronic audio systems, including techniques for electronically capturing and characterizing acoustic events to improve performance and reduce power consumption while executing a sound classification algorithm.

BACKGROUND

A sound classifier is a computer program that can identify a sound as being for example that of a dog barking, a person talking, or a siren. It does so by converting a digital, time domain microphone signal (e.g., a full spectrum or wide band signal such as a multi-megabits/sec pulse density modulated microphone signal) into frequency domain and then processing the frequency domain version to automatically discriminate between the different sounds. The results provided by the sound classifier may be used to for example wake up a computing device that is in sleep mode or alert a hearing impaired user of the computing device. In many cases, the sound classifier is being executed in a portable computing device such as a smartphone or a headset, and is operating continuously for a long period of time. This means that in addition to the expected speed and accuracy performance of a sound classification application, the power consumption of the computing device that is executing the application is also of concern.

SUMMARY

An acoustic event sensor is described whose output provides specific and useful information in digital form about a detected acoustic event, while doing so at reduced bitrate and reduced power consumption. The sensor output may be used by a sound classifier. In one aspect, the acoustic event sensor is an integrated circuit package having the following components: an array of acoustical to electrical transducers that produce analog audio sub-band signals, an analog detector circuit to receive each of the analog audio sub-band signals and produce for each sub-band a number of analog property signals, an analog to digital converter (ADC) to digitize each of the analog property signals, and an encoder to receive each of digitized analog property signals and produce for each sub-band a feature. This results in one or more features for the respective sub-band. The sensor can operate continuously thereby producing a sequence (over time) of several instances of the feature for each sub-band. This sequence may be serialized and then transmitted to another integrated circuit package such as a system on a chip (SoC) that may be executing a sound classifier application (e.g., within the same portable computing device). Alternatively, the serialized instances of the features may be transmitted to another device via a wireless connection, e.g., from a wireless headset to a companion smartphone or a companion tablet computer.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
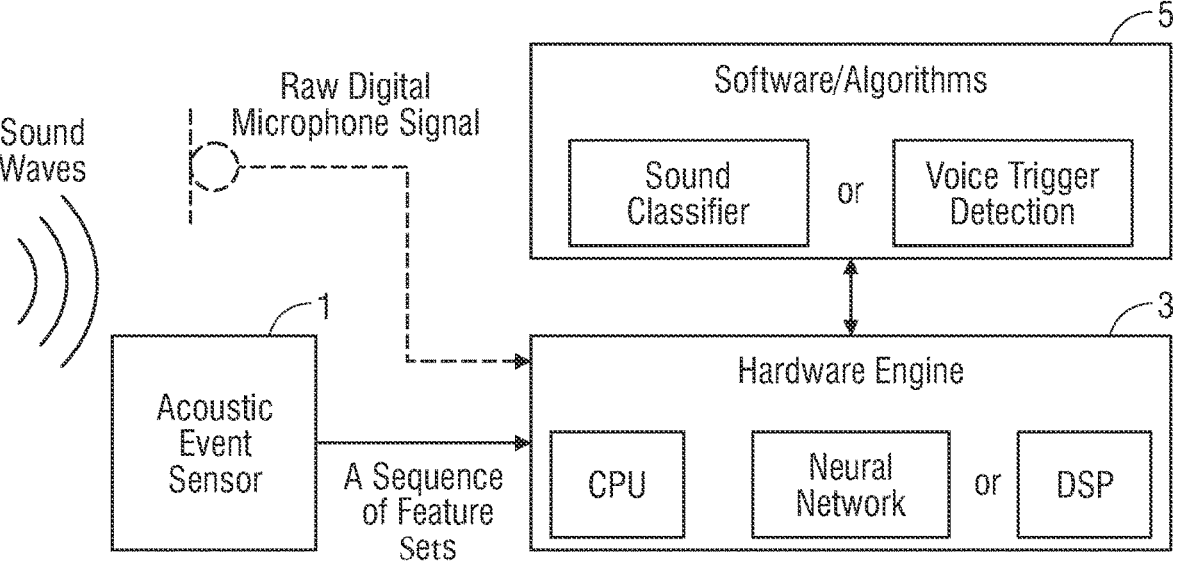
FIG. 1 is a block diagram of an example system application of an acoustic event sensor.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

An acoustic event sensor (sensor 1) is described whose output provides specific and useful information in digital form about a detected acoustic event, while doing so at reduced bitrate and reduced power consumption. The sensor 1 detects acoustic events within sound waves and can be used as part of a system for example as shown in the block diagram of FIG. 1. The sensor 1 may be part of a microelectronic circuit that is integrated into a headset or other electronic system that "listens" to sound waves for different purposes, such as a smartphone, a tablet computer, a smart speaker, etc. The output of the sensor 1 may be a sequence of instances of digital, feature sets (as described further below) that is provided to an electronic hardware engine 3. The hardware engine may include a central processing unit (CPU), a neural network, or a digital signal processor (DSP), for example as part of a system on a chip (SoC). Software/algorithm 5 such as a sound classifier or a voice trigger detector is executed by the hardware engine, and given access to the real-time, sequence of feature sets being received from the sensor 1. The software/algorithm then makes a decision on what the sound waves contain, using the sequence of feature sets. In one aspect, that decision can be made without requiring or processing a contemporaneous, always-on, high resolution, wide band, digital audio signal produced by the microphone (shown in dotted lines), thereby reducing power consumption.

The software/algorithm 5 may be a sound classification algorithm that analyzes and classifies a sequence of feature sets (received over a certain time interval of for example one second) as containing one of several, previously determined sounds of interest, e.g., breaking glass, door opening, door closing, dog bark, onset of speech, siren, coughing. Such sounds of interest may be used to determine a user context in which the larger system of which the sensor 1 is a part, such as a headset or a smartphone, is being used. The software/algorithm 5 could alternatively be a voice trigger detection algorithm that analyzes the sequence of feature sets to determine the presence therein of a voice trigger phrase. Upon detecting the voice trigger phrase, an automatic speech recognition algorithm in a virtual assistant application being executed in the system, may be triggered. The sequence of feature sets output by the sensor 1 may also be used by other software/algorithms.

Figure 2:
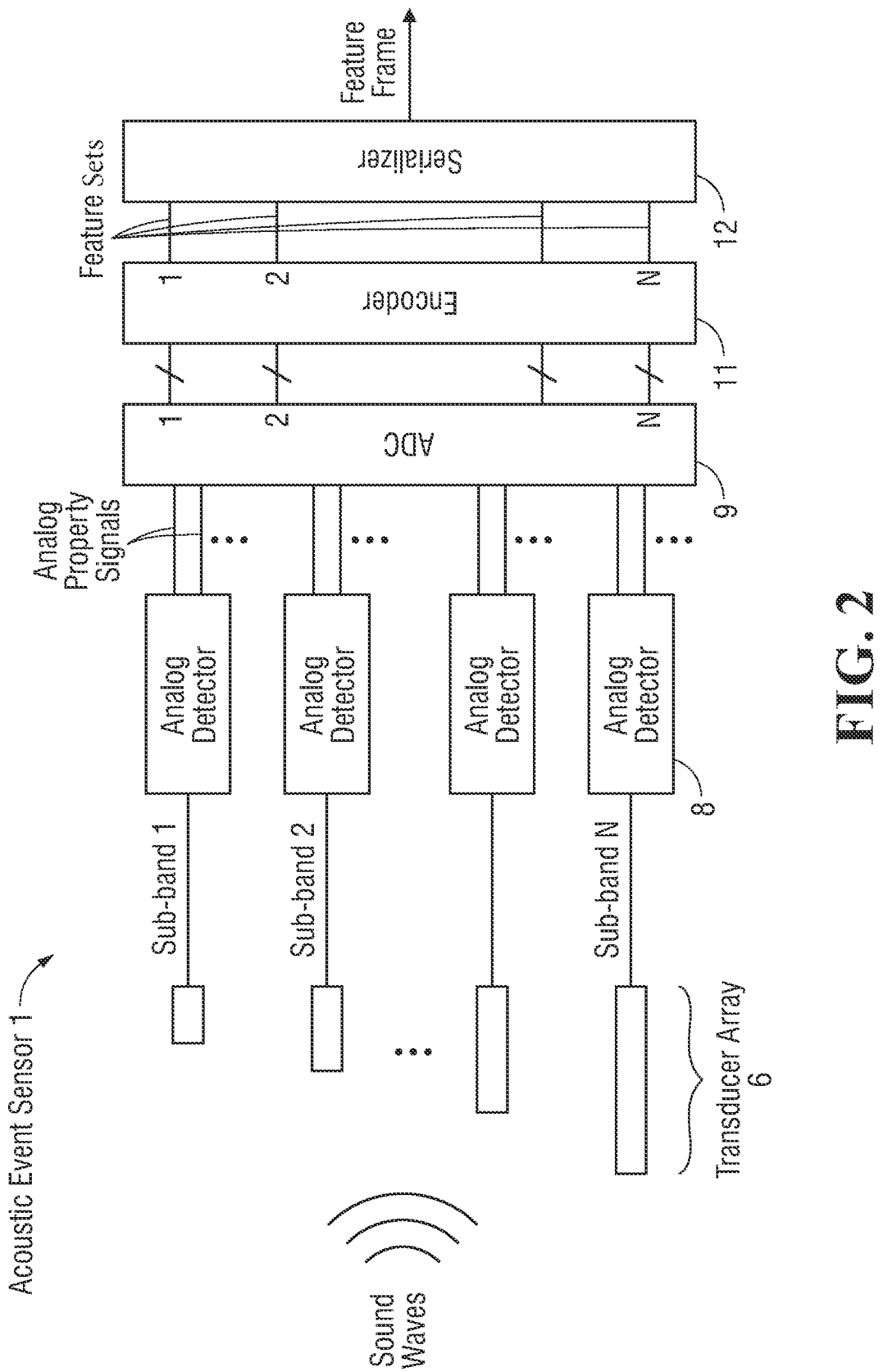
FIG. 2 is a block diagram of an example acoustic event sensor.

The sensor 1 may be an integrated circuit package having integrated therein several electronic components forming a chain of signal processing components, such as those depicted in FIG. 2. This chain may begin with a transducer array 6 on which the sound waves impinge. The transducer array 6 may include an array of acoustic to electrical transducers, which responds to the sound waves by producing a number N (being two or more) electrical, analog audio sub-band signals, representing N sub-bands or frequency bins, respectively, of the sound waves. The transducer array may be a micro electrical mechanical system (MEMS) structure of mechanical resonators having for example different sized resonant air cavities (depicted by the different sized rectangles). The transducer array may be implemented using any suitable acoustic to electric transducer technology including acoustic to opto-electrical for example using optical waveguide acoustic sensors or, more generally, using any suitable optical techniques as part the transduction to electrical analog audio sub-band signals. The transducer array 6 may function like a filter bank that has been tuned to mimic human hearing, when responding to incoming sound waves. It decomposes the incident sound energy at the acoustic-mechanical or acoustic-optical interface into frequency domain, as the N analog audio sub-band signals. Viewed another way, the transducer array 6 separates the acoustic energy of the sound waves into a number of constituent frequency sub-bands, represented by the analog audio sub-band signals. An analog audio sub-band signal may for example be a voltage signal (from a voltage source circuit in the transducer array 6) or a current signal (from a current source circuit in the transducer array 6).

Figures 3, 4:
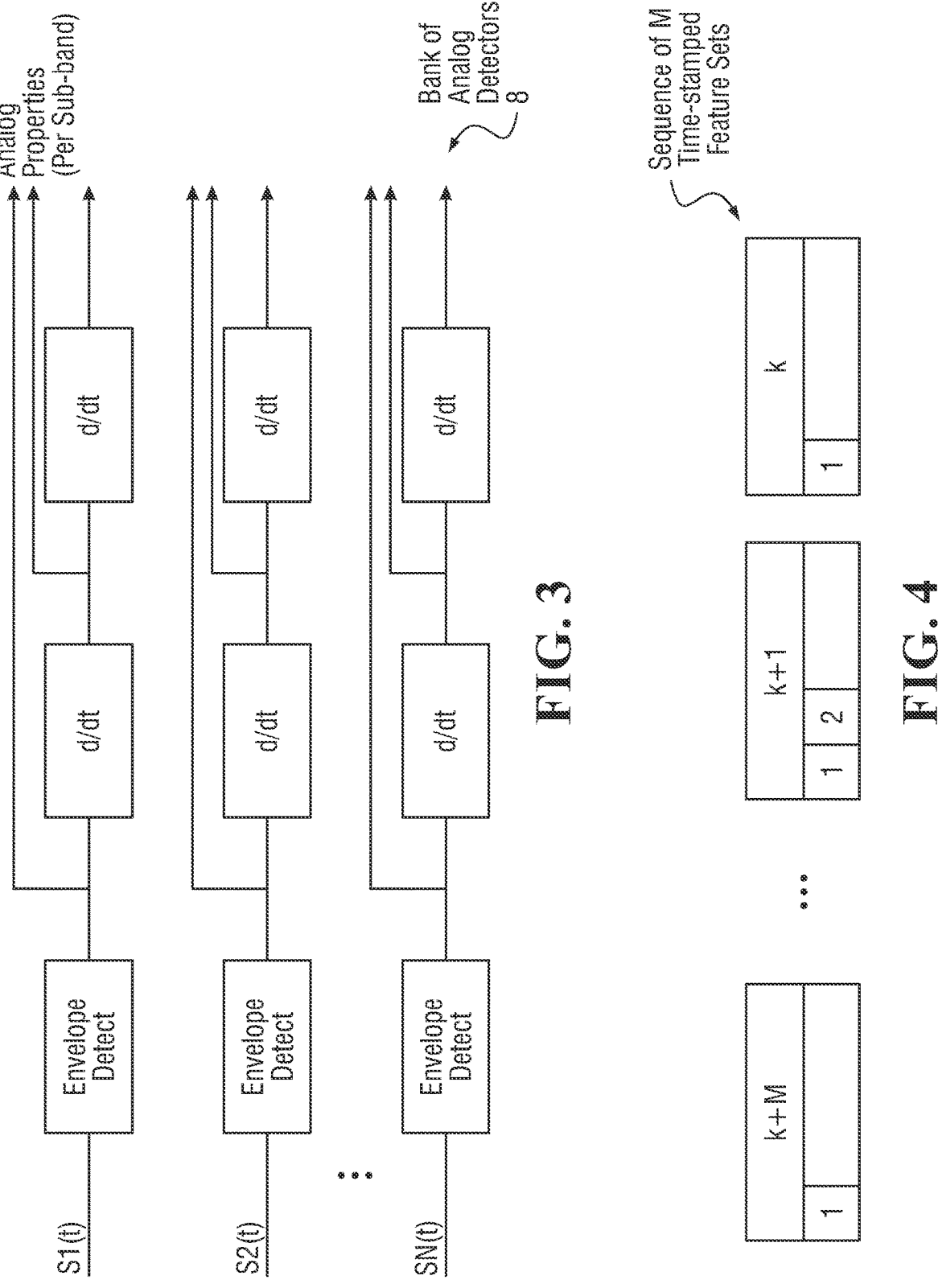
FIG. 3 is a circuit schematic of an example analog section of the sensor.
FIG. 4 illustrates a sequence of time-stamped instances of feature sets, as output by the acoustic event sensor.

Next in the chain of processing shown in FIG. 2 is an analog detector circuit that receives each of the analog audio sub-band signals, and in response produces for each sub-band several analog property signals. There may be a separate instance of an analog detector 8 for each sub-band, as shown in the bank of analog detectors 8 in FIG. 3, that produces a separate set of analog property signals. More generally, the analog detector 8 extracts in analog form several properties from its input analog audio sub-band signal, s(t). These are properties of the input analog audio sub-band signal. As seen in the example of FIG. 3, the properties may include the envelope of the analog audio sub-band signal (extracted by an envelope detector), the first derivative d/dt of the envelope, and the second derivative d2/dt2 of the envelope. In other words, the properties are extracted by determining, using an analog slope detector, a rate of change over time of the envelope of the analog audio sub-band signal, be it the first derivative, the second derivative, or both. Higher order or more complex properties may also be extracted. The properties should be chosen to characterize the dynamic nature of the sound energy in each of the sub bands and thereby convey information that is useful to a sound classification algorithm. Note that the properties themselves are not audio signals and are hence not audible.

Returning to FIG. 2, an analog to digital conversion circuit (ADC 9) digitizes the analog property signals, on a per sub-band basis. The ADC 9 may have lower resolution and lower sampling rate than a typical, wide band digital audio system whose sampling rate is 44 kHz or higher and whose bit depth (resolution) is 16 bits or higher. This is possible because the property signals (as described above) change more slowly than audio signals, and their subsequent use (by an encoder 11, described next) does not require as much detail as, for example, a sound recording process or a sound reproduction (playback) process. For example, in one aspect, sampling rate of the ADC 9 is no higher than 4 kHz, and resolution (bit depth) of the ADC 9 for each sub-band is no more than four binary bits. The digitized property signals (digitized properties) of a given sub-band may be for example the envelope, the first derivative, and the second derivative of the audio sub-band signal (for that sub-band). In one aspect, the ADC 9 simply indicates whether the first and second derivatives are positive or negative, and more bits could be used to quantize the envelope than the time derivatives. Other combinations and sampling rate and resolution are possible for the ADC 9 for quantizing the digitized property signals, that may result in the sensor having a total output bit rate that is lower than (e.g., by a factor of ten or more) the output bit rate of a conventional wideband digital microphone.

Next in the processing chain of FIG. 2 is the encoder 11 which receives the digitized analog property signals, and in response produces, for each sub-band, one or more features. More generally, the digitized properties for each of the sub-bands are encoded (or characterized) into one or more features (a feature set for each sub-band). This results in one instance of a feature set being produced for a particular time interval. Note also that the instances of a feature set for a high frequency sub-band may be produced at a higher rate than the instances of a feature set for a low frequency sub-band since audio content at higher frequencies changes more rapidly than at lower frequencies FIG. 4 illustrates a time sequence of M, time-stamped instances of the feature sets as output by the encoder 11. Each instance of the feature set represents the features that are sensed at a respective point in time (or a respective time interval). The sequence of feature sets represent an acoustic event, lasting a period of time that spans the time indices k, k+1, . . . k+M. In this example, index k has a feature set containing an entry for only sub-band 1, index k+1 has two feature sets containing entries for sub-bands 1 and 2 only, and index k+M has a feature set containing an entry for only sub-band 1. Thus, although the encoder 11 is shown in FIG. 2 as having N outputs corresponding to the N sub-bands, not all of those outputs will be represented by feature sets at every time index. This aspect (producing feature sets for different sub-bands at different rates) will be explained with another example below in connection with FIG. 7.

In one aspect, the encoding operation involves determining a curvature of the envelope of the analog audio sub-band signal (or in other words, the resulting one or more features includes curvature). The curvature of a signal may be a variable that has four possible values, such as illustrated by the four graphs in FIG. 5. As such, it may be represented by two binary bits, as feature A (decreasing concave), feature B (decreasing convex), feature C (increasing concave) and feature D (increasing convex).

Figures 5, 6:
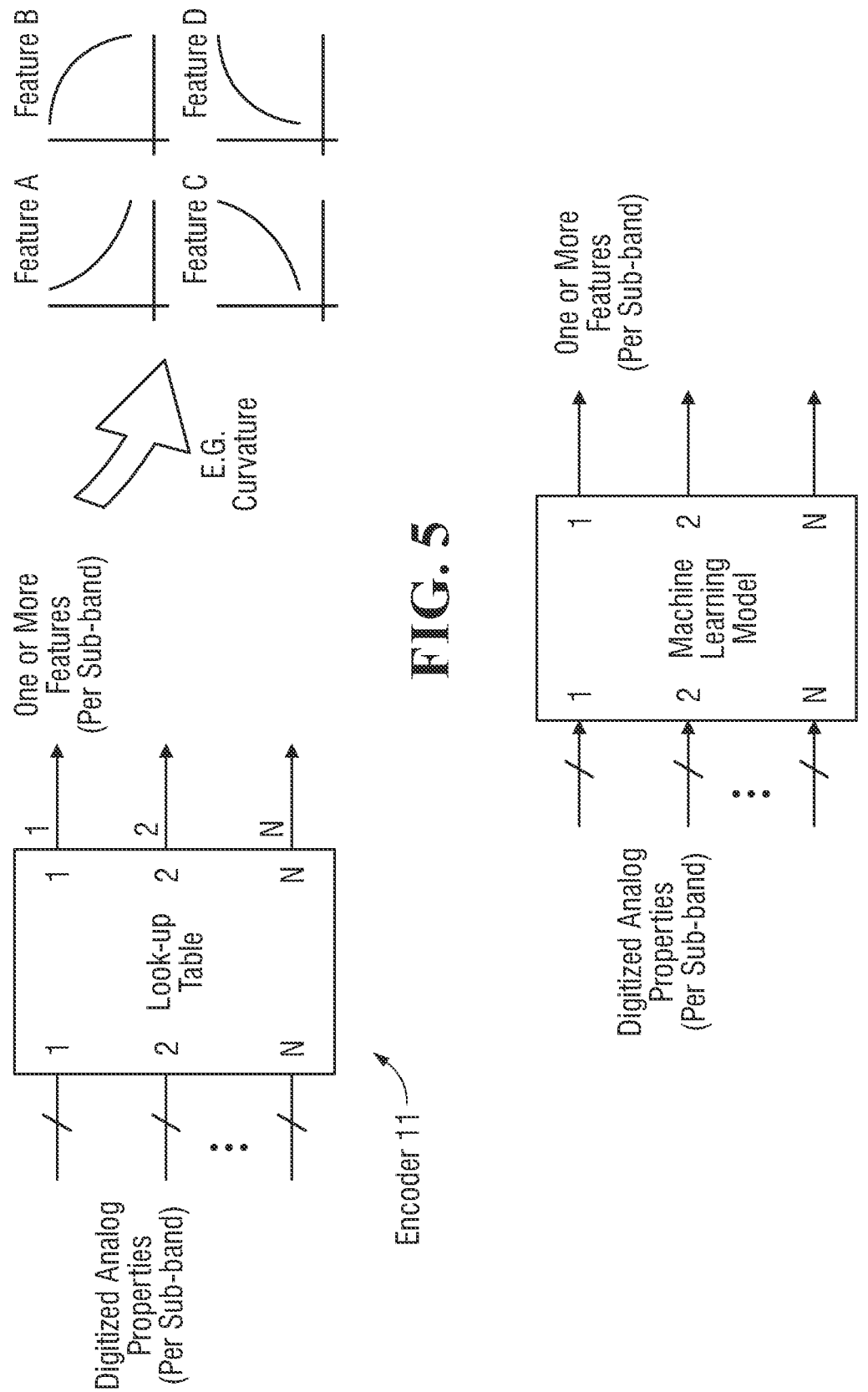
FIG. 5 depicts a look-up table that may be part of the digital encoder section of the sensor.
FIG. 6 shows a machine learning model that may be part of the digital encoder section of the sensor.

The curvature or any other possibly more complex feature of a given sub-band may be determined by analyzing the properties (e.g., envelope, first derivative, and second derivative) of the given sub-band over a certain time interval. This analysis could also be in conjunction with analyzing the properties of other sub-bands (in addition to the given sub-band). The analysis may involve the application of a formula to selected features of the given sub-band (and perhaps to those of other sub-bands). FIG. 5 depicts the case where the feature is determined by performing a table look-up, using a number of samples over time of the digitized properties. In other words, the encoder 11 in that case has a look-up table in which is stored a mapping between various properties (input) and a number of features (output). The encoder 11 in that case is configured to determine its output feature by i) forming an input to the look-up table using several samples (over time) of the digitized property signals, and ii) accessing one or more of the stored features in the look-up table using the input. In yet another aspect, analysis of the properties involves using a machine learning model (e.g., a neural network) that has been trained to recognize that certain patterns in its input properties correspond to certain output features, as depicted in FIG. 6.

Returning to the block diagram of FIG. 2, the sensor 1 may also include a serializer 12 that produces a feature frame (or rather a sequence of instances of feature sets). The feature frame will contain a time sequence of the feature sets that are actually produced at the output of the encoder 11. For instance, a feature frame may contain M instances as depicted in FIG. 4, where each instance is associated with a respective time interval (time index k). More generally, this refers to assembling a time sequence of up to N parallel-outputted features produced by the encoder 11, into a serial output format (a feature frame). The sensor 1 in continuous operation will produce a serialized version of the instances of the feature sets produced by the encoder 11.

The feature frame sequence produced by the serializer 12 may be time synchronized with a digital audio frame sequence (coming from a contemporaneous, digital microphone signal—not shown in FIG. 2, but see FIG. 1). The time synchronized feature frame sequence is processed by the software/algorithm 5—see FIG. 1—to decide which type of sound has been sensed or whether or not a voice trigger phrase has been sensed. The sound classifier or voice trigger detector may then mark a corresponding time interval in the digital microphone signal where it detected the particular type of sound or a particular voice trigger phrase in its processing of the feature frame sequence. This process is advantageously performed, using the sensor 1, to exhibit reduced power consumption as compared to the typical case where the software/algorithm 5 relies only upon the high resolution digital wide band audio signal from the microphone.

To further reduce power consumption when digitizing the properties by the ADC 9 (see FIG. 2), the ADC 9 may be configured to have different sampling rates applied to different sub-bands, such that the sampling rate for a low frequency sub-band is lower than the sampling rate for a high frequency sub-band. Also, one or more of the sub-band signal processing chains in the sensor 1 may be selectively disabled, which reduces power consumption, if for example the information content in a particular sub-band is not likely to be of interest to the software/algorithm 5 while in a specific user context or during a particular system operating mode.

Figure 7:
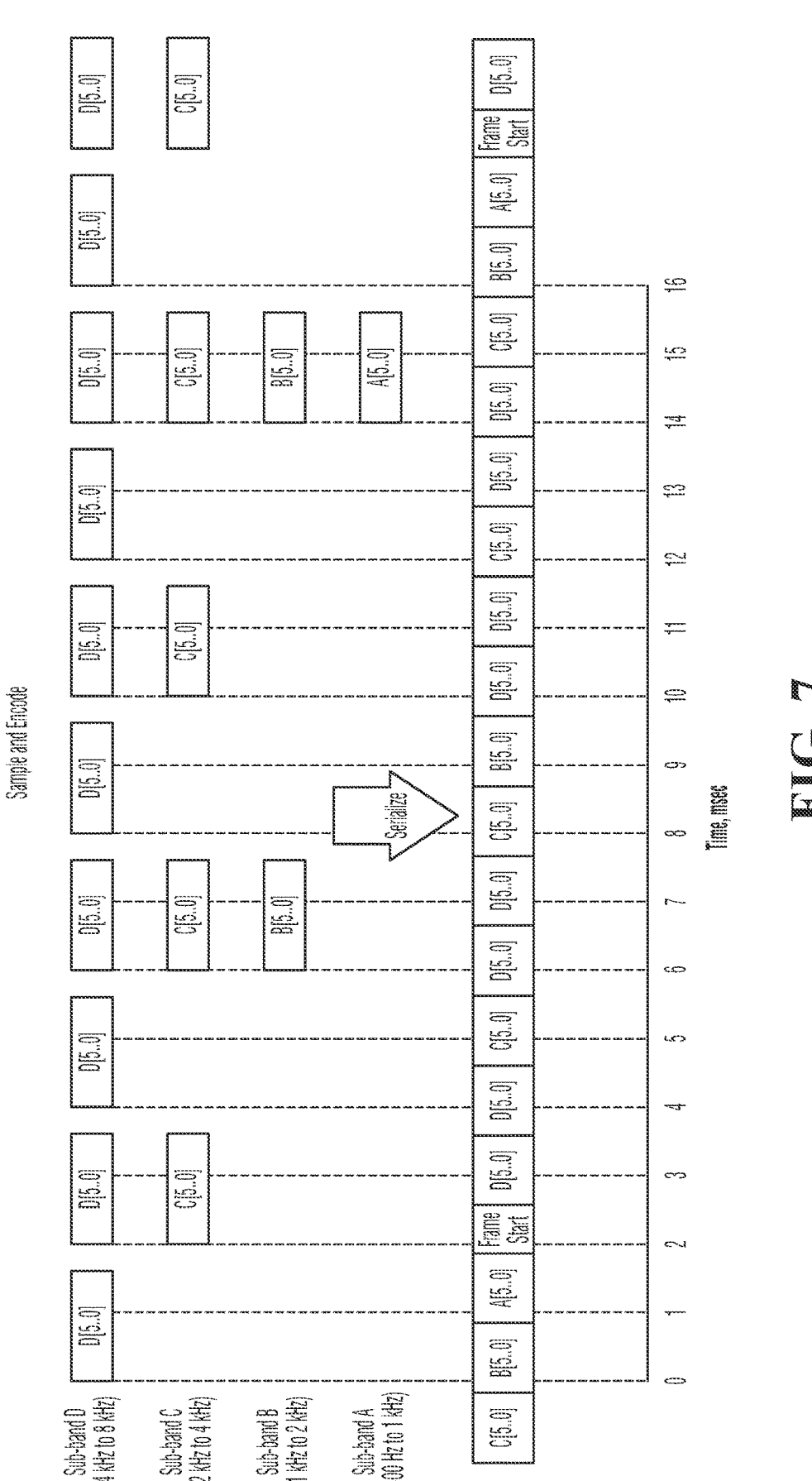
FIG. 7 illustrates an example of the outputs of the encoder and a serializer.

FIG. 7 illustrates an example of the outputs of the encoder and the serializer. In this example, the ADC is sampling in four 1-octave sub-bands as shown, covering a total bandwidth of 8 kHz. The bit depth at the output of the encoder in this example is set to six and is the same for each sub-band—each instance of a feature set is six bits long. Since high frequency information changes more rapidly, the serialized output (depicted by the row of feature sets in sequence at the bottom, just above the time x-axis) contains more instances per second of features from high-frequency sub-bands (e.g., sub-band D), and fewer instances per second of features from low-frequency sub-bands (e.g., sub-band B). In particular, each frame contains, in this example, eight instances of feature set D[5 . . . 0] for sub-band D, four instances of feature set C[5 . . . 0] for sub-band C, two instances of feature set B[5 . . . 0] for sub-band B, and one instance of feature set A[5 . . . 0] for sub-band A. To illustrate the significant reduction in output bit rate of the sensor 1, consider the following numerical example: the envelope and derivatives of sub-band D may be sampled at 500 Hz and encoded into the feature set D[5 . . . 0] as being six bits long, those of sub-band C may be sampled at 250 Hz and encoded into the six bits long feature set C[5 . . . 0], those of sub-band B may be sampled at 125 Hz and encoded into the six bits long feature set B[5 . . . 0], and those of sub-band A may be sampled at 62.5 Hz and also encoded into a six bits long feature set. The serializer assembles these six-bit features sets into an interleaved time sequence of a feature frame, of about sixteen milliseconds as shown and having a total of ninety bits—in other words, an output bit rate of 5625 bits/second. Compare that to a conventional digital microphone having a 16 kHz sampling rate at a bit depth of 16 bits per sample, resulting in 256 kbits/second. More generally, the serialized output of the sensor 1 may be encoded and time interleaved (feature sets of different sub-bands are interleaved over time, as shown in the example) using any suitable prescribed pattern including different feature order, variable bit length encoding, and different frame lengths, that delivers information at different rates from the respective sub-bands.

While certain aspects have been described above and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For example, although FIG. 2 shows the ADC 9 as a single block having N sets of digital outputs corresponding to N sets of two or more analog inputs, respectively, the ADC 9 may be implemented as a single analog to digital converter whose single set of one or more analog inputs are shared by the outputs of all N analog detectors 8 (using for example a multiplexer circuit). The description is thus to be regarded as illustrative instead of limiting.

What is claimed is:

1. A method for acoustic event sensing, the method comprising:
   separating acoustic energy into a plurality of sub-bands as a plurality of analog audio sub-band signals;
   extracting in analog form a plurality of properties from each of the plurality of analog audio sub-band signals wherein the plurality of properties include a first derivative and an envelope of the analog audio sub-band signal;

digitizing the plurality of properties for each of the plurality of sub-bands, after extracting the plurality of properties in analog form;

encoding the digitized plurality of properties for each of the sub-bands into a feature set being one or more features; and analyzing the feature set to classify the acoustic energy or detect a voice trigger phrase.

2. The method of claim 1 performed by a microelectronic circuit that is integrated into a headset.

3. The method of claim 2 wherein extracting further comprises:

determining a second derivative of the envelope.

4. The method of claim 3 wherein encoding comprises determining a curvature of the envelope of each of the analog audio sub-band signals, wherein the one or more features comprises the curvature.

5. The method of claim 1 wherein digitizing the properties comprises a sampling rate for a first frequency sub-band that is lower than a sampling rate for a second frequency sub-band, the first frequency sub-band being lower than the second frequency sub-band.

6. The method of claim 1 wherein encoding comprises determining the one or more features of each sub-band by performing a table look-up using a plurality of samples over time of the digitized properties.

7. The method of claim 1 further comprising assembling a time sequence of a plurality of instances of the feature set for each of the sub-bands where each instance of the feature set is associated with a respective time interval and feature sets of different sub-bands are interleaved in the time sequence, and instances of a feature set for a higher frequency sub-band are produced at a higher rate than instances of a feature set for a lower frequency sub-band.

8. The method of claim 7 wherein analyzing the feature set comprises performing a sound classification algorithm using the time sequence of the plurality of instances of the feature set for each of the sub-bands.

9. The method of claim 1 wherein the encoding is performed by a machine learning model.

10. The method of claim 1 wherein extracting further comprises:

determining a second derivative of the envelope.

11. The method of claim 1 wherein encoding comprises determining a curvature of the envelope of each of the analog audio sub-band signals, wherein the one or more features comprises the curvature.

12. An apparatus for acoustic event sensing, comprising:

an acoustic event sensor configured to separate acoustic energy into a plurality of sub-bands as a plurality of analog audio sub-band signals, extract in analog form a plurality of properties from each of the plurality of analog audio sub-band signals wherein the plurality of properties include a first derivative and an envelope of the analog audio sub-band signal, digitize the plurality of properties, and encode the digitized plurality of properties for each of the plurality of sub-bands into a feature set being one or more features; and a processor configured to analyze the feature set to classify the acoustic energy or detect a voice trigger phrase.

13. The apparatus of claim 12 wherein the acoustic event sensor is a microelectronic circuit that is integrated into a headset along with the processor.

14. The apparatus of claim 13 wherein the acoustic event sensor comprises a machine learning model that performs the encoding.

15. The apparatus of claim 13 wherein the acoustic event sensor is configured to assemble a time sequence of a plurality of instances of the feature set for each of the sub-bands where each instance of the feature set is associated with a respective time interval, and the headset further comprises a microphone whose output digital audio microphone signal is synchronized with the time sequence of the plurality of instances of the feature set but is not an always-on digital audio microphone signal.

16. The apparatus of claim 15 wherein the processor is configured to, upon detecting the voice trigger phrase, trigger an automatic speech recognition algorithm in a virtual assistant application to analyze the output digital audio microphone signal.

17. The apparatus of claim 12 wherein the acoustic event sensor is configured to assemble a time sequence of a plurality of instances of the feature set for each of the sub-bands where each instance of the feature set is associated with a respective time interval and feature sets of different sub-bands are interleaved in the time sequence, and instances of a feature set for a higher frequency sub-band are produced at a higher rate than instances of a feature set for a lower frequency sub-band.

18. The apparatus of claim 17 wherein the processor analyzes the feature set by performing a sound classification algorithm using the time sequence of the plurality of instances of the feature set for each of the sub-bands.

19. The apparatus of claim 12 wherein the acoustic event sensor encodes the digitized properties into a feature set by determining the one or more features of each sub-band by performing a table look-up using a plurality of samples over time of the digitized properties.

* * * * *